United States Patent
Privault et al.

(10) Patent No.: US 7,552,051 B2
(45) Date of Patent: Jun. 23, 2009

(54) METHOD AND APPARATUS FOR MAPPING MULTIWORD EXPRESSIONS TO IDENTIFIERS USING FINITE-STATE NETWORKS

(75) Inventors: Caroline Privault, Corenc (FR); Herve Poirier, La Tronche (FR)

(73) Assignee: Xerox Corporation, Norwalk, CT (US)

( * ) Notice: Subject to any disclaimer, the term of this patent is extended or adjusted under 35 U.S.C. 154(b) by 550 days.

(21) Appl. No.: 10/248,058

(22) Filed: Dec. 13, 2002

(65) Prior Publication Data

US 2004/0128122 A1 Jul. 1, 2004

(51) Int. Cl.
*G10L 15/04* (2006.01)
*G06F 17/27* (2006.01)

(52) U.S. Cl. .................. 704/255; 704/251; 704/254; 704/9

(58) Field of Classification Search .......... 704/255, 704/251, 254, 9
See application file for complete search history.

(56) References Cited

U.S. PATENT DOCUMENTS

| | | | | |
|---|---|---|---|---|
| 4,555,796 | A * | 11/1985 | Sakoe | 704/241 |
| 5,594,641 | A * | 1/1997 | Kaplan et al. | 707/1 |
| 5,642,522 | A | 6/1997 | Zaenen et al. | 395/794 |
| 5,644,774 | A | 7/1997 | Fukumochi et al. | 395/754 |
| 5,696,962 | A * | 12/1997 | Kupiec | 707/4 |
| 5,819,260 | A * | 10/1998 | Lu et al. | 707/3 |
| 5,845,306 | A | 12/1998 | Schabes et al. | 707/532 |
| 5,950,184 | A | 9/1999 | Karttunen | 707/1 |
| 6,266,634 | B1 * | 7/2001 | Buchsbaum et al. | 704/232 |
| 6,321,372 | B1 | 11/2001 | Poirier et al. | 717/1 |
| 6,393,389 | B1 | 5/2002 | Chanod et al. | 704/7 |
| 6,629,066 | B1 * | 9/2003 | Jackson et al. | 704/9 |
| 7,346,511 | B2 * | 3/2008 | Privault et al. | 704/255 |

OTHER PUBLICATIONS

Mohri, Mehryar, "Finite-State Transducers in Language and Speech Processing", 1997, Association for Computational Linguistics.*
Roche, Emmanuel, "Factorization of Finite-State Transducers", Feb. 1995, Mitsubishi Electric Research Laboratories, 13 pages + Abstract.*
Andre Kempe, "Factorization of Ambiguous Finite-State Transducers", Revised Papers from the 5th International Conference on Implementation and Application of Automata, 2000.*

(Continued)

*Primary Examiner*—Richemond Dorvil
*Assistant Examiner*—E. Yen
(74) *Attorney, Agent, or Firm*—Fay Sharpe LLP (57) ABSTRACT

Multiword expressions are mapped to identifiers using finite-state networks. Each of a plurality of multiword expressions is encoded into a regular expression. Each regular expression encodes a base form common to a plurality of derivative forms defined by ones of the multiword expressions. Each of the plurality of regular expressions is compiled with factorization into a set of finite-state networks. A union of the finite-state networks in the set of finite-state networks is performed to define a multiword finite-state network and a set of subnets. The multiword finite-state network and the set of subnets are traversed to identify a path corresponding to one of the plurality of multiword expressions, wherein only transitions originating from the multiword finite-state network are accounted for to ascertain a path number identifying a base form of the one of the plurality of multiword expressions.

20 Claims, 9 Drawing Sheets

OTHER PUBLICATIONS

Bauer et al., "LOCOLEX: the translation rolls off your tongue", Proceedings of ACH-ALLC, Santa-Barbara, USA, 1995.

Breidt et al., "Formal description of Multi-word Lexemes with the Finite State formalism: IDAREX", Proceedings of COLING, Copenhagen, Danmark, 1996.

Chanod et al., "A Non-Deterministic Tokeniser for Finite-State Parsing", Proc. ECAI '96 workshop on 'Extended finite state models of language' Budapest, 1996.

Karttunen, "Constructing lexical transducers", published in Proceedings of COLING-94, 1:406-411, Kyoto, Japan, 1994.

Lucchesi, et al., "Applications of finite automata representing large vocabularies", Software-Practice and Experience, vol. 23(1):15-30, 1993.

Segond et al., "Using a finite-state based formalism to identify and generate multiword expressions", Technical report MLTT-019, Rank Xerox Research Centre, Grenoble, 1995.

Segond et al., "IDAREX: formal description of German and French Multi-Word Expressions with Finite-State Technology", MLTT-022, Nov. 1995.

Silberztein, "INTEX: a corpus processing system", Proceedings of COLING-94, vol. 1, Kyoto, Japan, 1994.

Silberztein, "INTEX", (English Translation: Jordan Greenwood, Edition: Cederick Fairon) available on the Internet at http://grelis.univ-fcomte.fr/intex/downloads/Manual.pdf, 2001.

Silberztein, "INTEX and the processing of natural languages", available on the Internet at http://grelis.univ-fcomte.fr/intex/downloads/Notes.pdf.

Woods, "Transition Network Grammars of Natural Language Analysis", in Communications of the ACM, 13, 591-606, 1970. (Reprinted in Grosz B.J., K. S. Jones and B.L. Webber (eds.) Readings in Natural Language Processing. Los Altos, USA: Morgan Kaufmann, 1986, pp. 71-87).

"XeLDA Overview" Xerox XeLDA® the linguistic engine, Jun. 2002.

"XeLDA C++ API Programmer's Guide", Xerox XeLDA® the linguistic engine, Jun. 2002.

U.S. Appl. No. 10/216,915 entitled "Information Retrieval And Encoding Via Substring-Number Mapping".

* cited by examiner

METHOD AND APPARATUS FOR MAPPING MULTIWORD EXPRESSIONS TO IDENTIFIERS USING FINITE-STATE NETWORKS

CROSS REFERENCE TO RELATED APPLICATIONS

Cross-reference is made to U.S. patent application Ser. No. 10/248,057, entitled "Method And Apparatus For Recognizing Multiword Expressions", by Caroline Privault et al., which is assigned to the same assignee as the present invention and incorporated herein by reference.

BACKGROUND OF INVENTION

The present invention relates to information processing, and more particularly to a method and apparatus for mapping multiword expressions to identifiers using finite-state networks.

Information processing ranges from tokenization, to morphological analysis, disambiguation, and parsing. These aspects of information processing and other aspects of language processing can be efficiently performed using finite-state networks. Such networks are compiled from regular expressions, a formal language for representing sets and relations. A relation is a set of ordered string pairs, where a string is a concatenation of zero or more symbols.

Finite-state networks have been used to develop a contextual dictionary lookup system for multiword expressions. To correctly interpret the meaning of multiword expressions, they need to be recognized as complex lexical units because one multiword expression may take on many variations. For example, multiword expressions include idiomatic expressions (e.g., "to rack one's brains over"), proverbial sayings (e.g., "birds of a feather flock together"), phrasal verbs (e.g., "to come up with"), lexical and grammatical collocations (e.g., "with regard to"), compound terms (e.g., "online dictionary").

Examples of a system for processing multiword expressions are disclosed by Silberztein in "INTEX: a corpus processing system", published in Proceedings of COLING-94, Vol. 1, Kyoto, Japan, 1994. Other examples of systems for processing multiword expressions are disclosed in U.S. Pat. Nos. 5,644,774 and 5,845,306.

Another example system for processing multiword expressions is the Xerox Linguistic Development Architecture (XeLDA®) that provides as part of its linguistic services idiom recognition and contextual bi-lingual dictionary lookup. XeLDA uses an idiomatic regular expression language (IDAREX) for describing idiomatic expressions and an idiomatic expression compiler for incorporating regular expressions defined using IDAREX into finite-state networks. Contextual bi-lingual dictionary lookup in XeLDA is performed by retrieving a word's context and using that context to find its translation.

Further aspects of XeLDA are published in "XeLDA Overview" and "XeLDA C++ API Programmer's Guide", Xerox XeLDA® the linguistic engine, June, 2002 and U.S. Pat. No. 6,321,372. In addition, further background concerning XeLDA's recognition of multiword expressions is described in U.S. Pat. Nos. 5,642,522 and 6,393,389, which are incorporated herein by reference, and the disclosure by Bauer et al., "LOCOLEX: the translation rolls off your tongue", published in Proceedings of ACH-ALLC, Santa-Barbara, USA, 1995.

More specifically, contextual bi-lingual dictionary lookup is performed in XeLDA by segmenting input text into sentences. Each sentence is segmented into words, morphologically analyzed, and disambiguated before being compiled into a sentence finite-state network. Each word of the sentence is looked up in a language dictionary. For each entry in the language dictionary that has an associated finite-state network of idioms, the sentence finite-state network is matched against complete paths in the associated finite-state network of idioms. The collection of complete paths in the associated finite-state networks of idioms identifies the idioms (or multiword expression) for the input sentence.

Even though every word in XeLDA's language dictionaries are not associated with a finite-state network of idioms, there exist significant memory demands at runtime for loading and unloading these networks even if caching is used. In addition, because an input sentence is processed word-by-word in XeLDA, the same finite-state network of idioms may be referenced by more than one entry in a dictionary, possibly leading to efficiency losses in which the network is loaded and unloaded from memory multiple times and the same idiom is matched multiple times. Also, idioms made up of short words may be missed because efficient word-by-word processing requires skipping words less than a predefined number of characters long (e.g., 3).

Accordingly it would be desirable to provide an improved system for recognizing multiword expressions that overcomes these and other limitations of existing systems and methods for identifying multiword expressions.

SUMMARY OF INVENTION

In accordance with the invention, there is provided a method, apparatus and article of manufacture therefor, for mapping multiword expressions to identifiers using finite-state networks. Each of a plurality of multiword expressions is encoded into a regular expression. Each regular expression encodes a base form common to a plurality of derivative forms defined by ones of the multiword expressions. Each of the plurality of regular expressions is compiled with factorization into a set of finite-state networks. A union of the finite-state networks in the set of finite-state networks is performed to define a multiword finite-state network and a set of subnets. The multiword finite-state network and the set of subnets are traversed to identify a path corresponding to one of the plurality of multiword expressions, wherein only transitions originating from the multiword finite-state network are accounted for when a path number identifying a base form of the one of the plurality of multiword expressions.

Advantageously this method and apparatus integrate multiword expressions for a language into a single finite-state network (i.e., the multiword finite-state network, as defined above, or the multiword transducer, as defined below). The single finite-state network of multiword expressions can thus be advantageously used to efficiently identify all paths and subpaths in a network representing the input string (i.e., the input automaton, as defined below) in one pass through the single finite-state network.

These advantages are realized because no word-by-word processing of the input string network is performed when matching the single finite-state network and no segmentation of the input string at the sentence level is performed when compiling the input string into a network. These advantages are further realized because subnets that repeat in the single finite-state network are factorized from it by inserting arcs with labels that reference the repeating subnets that have been defined as finite-state networks.

Yet another advantage is that the method and apparatus are adapted to perform path-to-number mapping on the single-finite state network to identify information concerning matches between the single finite state network and the input string network through optimized path-to-number mapping. The optimized path-to-number mapping advantageously does not allow paths through factorized subnets of the single-finite state network to contribute towards the computation of path numbers, thereby reducing the number of paths through the network (i.e., enabling all multiword expressions to be compiled as a single network).

Furthermore, since there is no word-by-word processing no short words are excluded during matches (i.e., words of all lengths are accounted for during matching). Yet an additional advantage of the method and apparatus is that all derivative forms of the input string are considered when matched with the single finite-state network of multiword expressions, thereby enabling multi-sense multiword expression identification. Yet a further advantage of the method and apparatus is that multiword expression matching may occur across sentences since no segmentation of the input string is performed at the sentence level (i.e., the input string is handled as a single text unit that is encoded in the input automaton).

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

A. Conventions

"Finite state automata" and "finite-state transducers" (FST) are both finite-state networks that are represented in the figures using directed graphs that consist of states and labeled arcs. All finite-state networks contain a single initial state, also called the start state, and any number of final states. In the figures, states are represented as circles and arcs are represented as arrows. Also in the figures, the start state is always the leftmost state and final states are marked by a double circle.

Each state in a finite-state network acts as the origin for zero or more arcs leading to some destination state. A sequence of arcs leading from the initial state to a final state is called a "path" (or "complete path"). A "subpath" is a sequence of arcs that does not necessarily begin at the initial state or end at a final state. An arc may be labeled either by a single symbol such as "a" or a symbol pair such as "a:b" (i.e., two-sided symbol), where "a" designates the symbol on the upper side of the arc and "b" the symbol on the lower side. If all the arcs are labeled by a single symbol, the network is an automaton; if at least one label is a symbol pair the network is a transducer.

B. Definitions

Set forth below are definitions of some of the principal terms used in this specification and figures. Other terms are explained at their first occurrence.

"Derivative forms" of a multiword expression: include both inflections (e.g., verb conjugation, gender, number (plural or singular)) and variations (e.g., adverbs or adjectives that are optionally inserted in an expression).

"Factorizing" or "factorize": means associating a label with a subnet and when building a network by inserting an arc with that label at each place where the subnet should appear.

"Idiomatic expression (or "idiom"): is a multiword expression whose meaning is not deducible from those of the individual words (e.g. "over the moon").

"Multiword expression": any combination or grouping of contiguous or non-contiguous strings.

"Multiword expression pattern": a finite-state network encoding possible derivative forms of a multiword expression.

"NONPOS": is a symbol that matches non-tag input symbols in a network.

"Transition network": a finite-state network consisting of states and labeled arcs; also named "automaton" or "transducer".

"Subnet" (or sub-network): a transition network "embedded" in a larger network; a subnet is associated with a label which appears on some arcs of the larger network. In the figures, a subnet is identified in a larger network with brackets around a symbol pair (e.g., "[V:V]").

"Part-of-speech (POS) (or tag): a tag that represents a grammatical category.

"Strings" (or words): are concatenations of symbols. The symbols may encode, for example, alphanumeric characters (e.g., alphabetic letters), music notes, chemical formulations, biological formulations, and kanji characters.

C. Operating Environment

Figure 1:
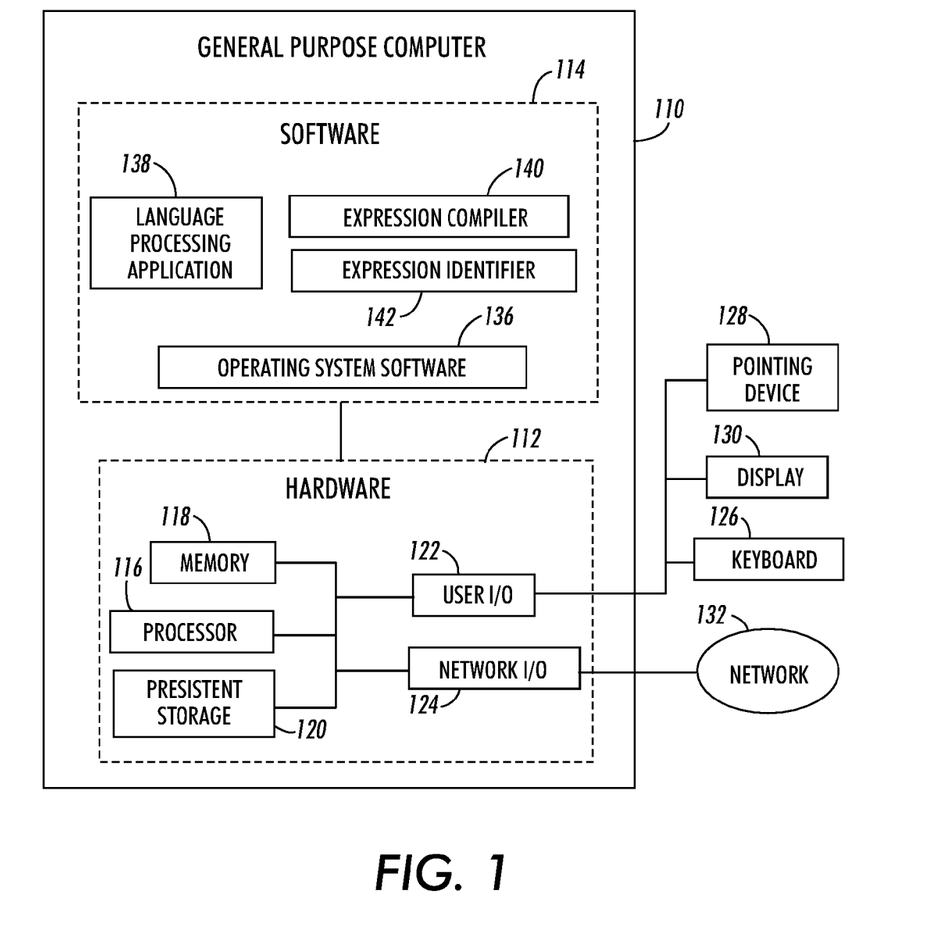
FIG. 1 illustrates a general purpose computer for carrying out the present invention.

FIG. 1 illustrates a general purpose computer 110 for carrying out the present invention. The general purpose computer 110 includes hardware 112 and software 114. The hardware 112 is made up of a processor (i.e., CPU) 116, memory 118 (ROM, RAM, etc.), persistent storage 120 (e.g., CD-ROM, hard drive, floppy drive, tape drive, etc.), user I/O 122, and network I/O 124. The user I/O 122 can include a keyboard 126, a pointing device 128 (e.g., pointing stick, mouse, etc.), and the display 130. The network I/O 124 may for example be coupled to a network 132 such as the Internet. The software 114 of the general purpose computer 110 includes an operating system 136, a language (or information) processing application 138, an expression compiler 140, and an expression identifier 142.

Figure 2:
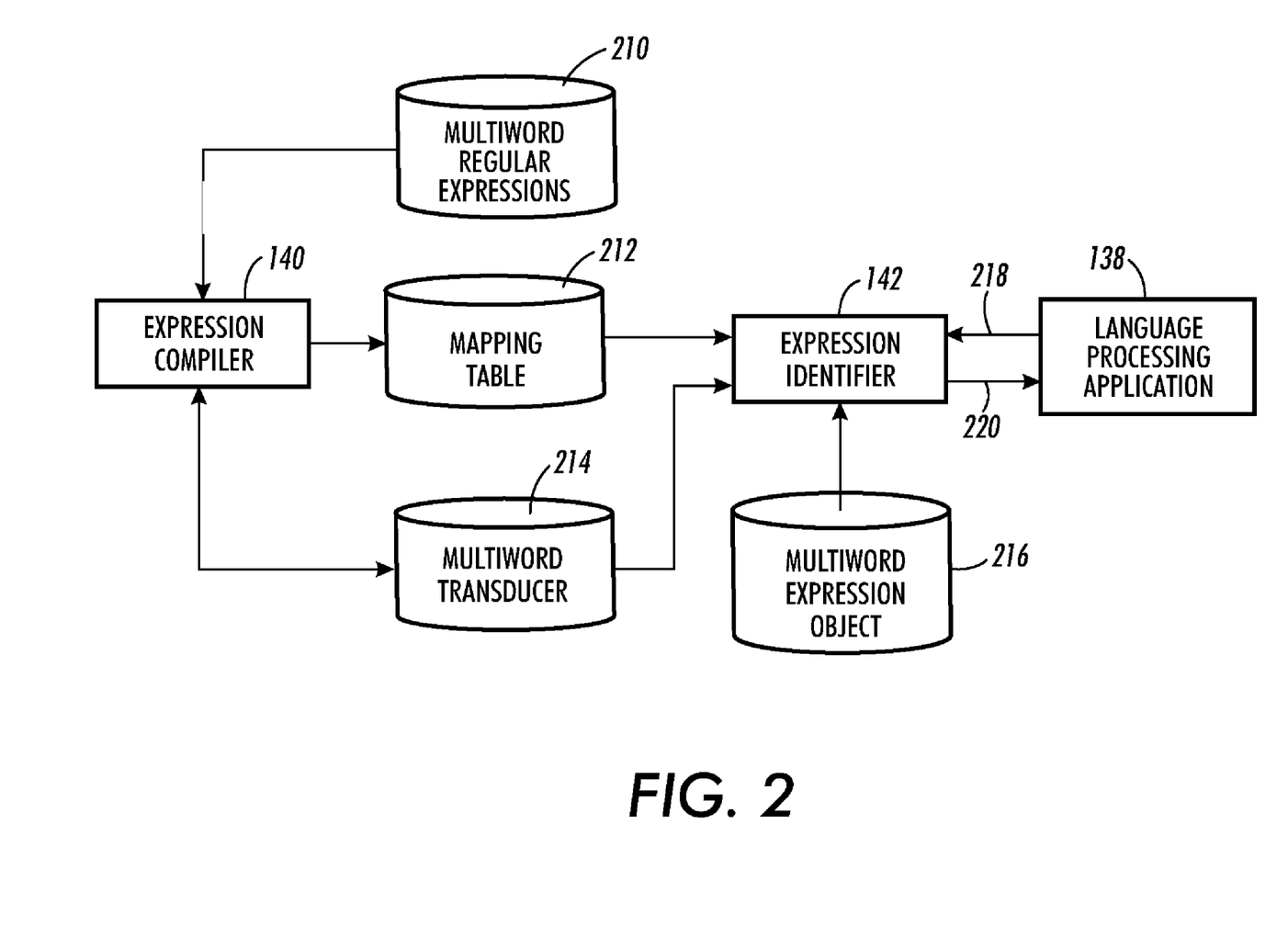
FIG. 2 illustrates one embodiment in which the information processing application, the expression compiler, and the expression identifier shown in FIG. 1 operate together.

FIG. 2 illustrates one embodiment in which the information processing application 138, the expression compiler 140, and the expression identifier 142 operate together. In operation as described in detail below, the expression compiler 140 consumes as input multiword regular expressions 210, and produces as output a mapping table 212 and a multiword expression finite-state network 214. The language processing application 138 provides as input to the expression identifier 142 an input string at 218.

The language processing application 138 may for example include one or more linguistic services for natural language processing such as foreign language comprehension. It and other natural language processing applications may include services such as tokenization, tagging, morphological analysis, language identification, disambiguation, idiom recognition, contextual dictionary lookup, translation, and terminology extraction. Alternatively, the language processing application 138 may include one or more applications for processing sequences of music or chemical and/or biological compositions. In alternate embodiments, the language processing application 138 may have integrated therein the expression compiler 140 and/or the expression identifier 142.

In operation the expression identifier 142 processes input strings 218 to identify multiword expressions 220 from the set of multiword regular expressions (MRE) 210 that are set forth in the input string 218. Using a multiword expression object 216 that corresponds to an identified multiword expression, the expression identifier 142 can provide at 220 both the base form of the identified multiword expression derived from its multiword regular expression and its inflected form derived from the input string, as well as, related data (e.g., a translation, a synonym, etc.) that is also derived from the base from of the identified multiword expression.

Figure 3:
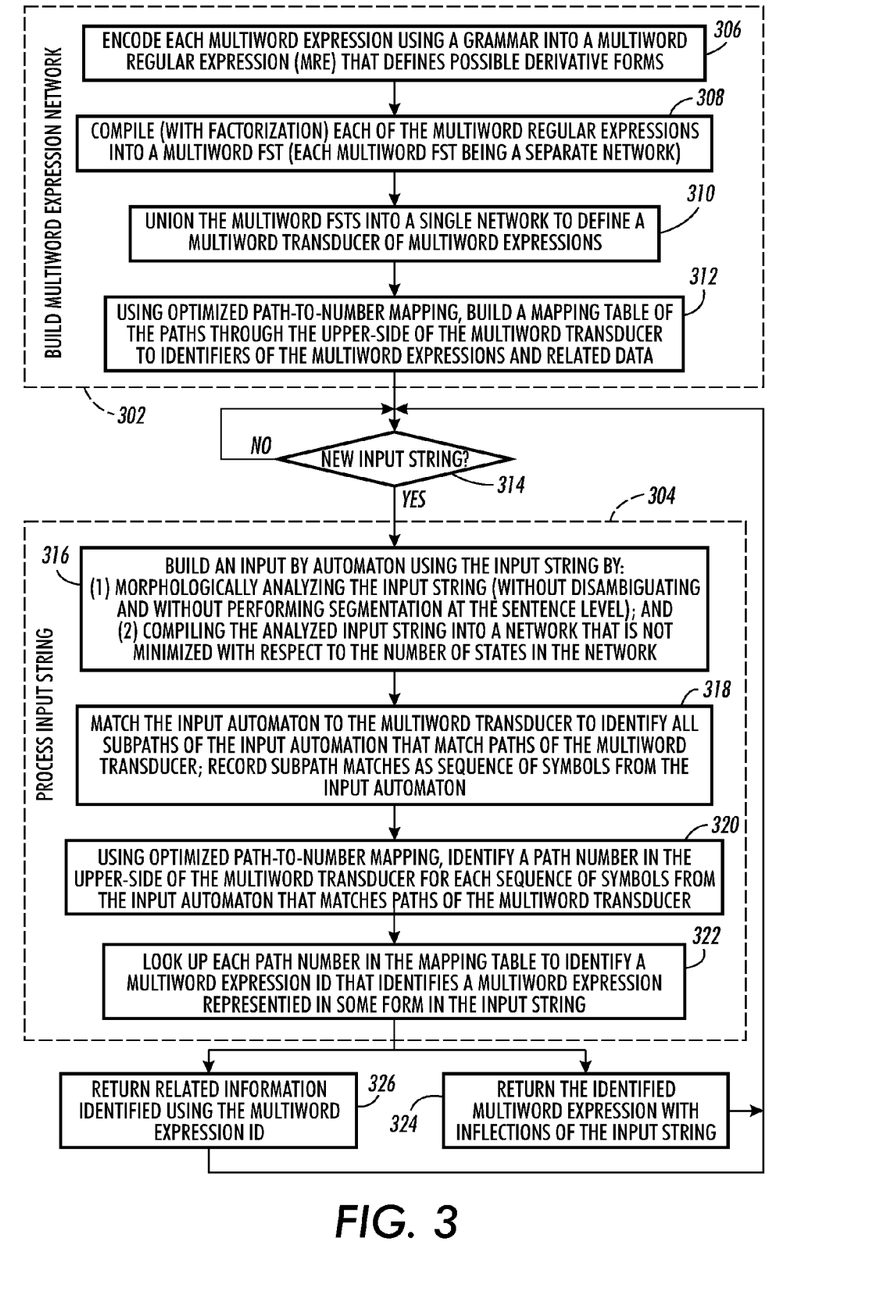
FIG. 3 sets forth a flow diagram for building the multiword expression network and for processing input strings to identify multiword expressions set forth therein.

FIG. 3 sets forth a flow diagram for building the multiword expression network 214 (at 302) and for processing the input string 218 to identify multiword expressions: set forth therein (at 304). Details for building the multiword expression network at 302 are described in section D below while referring to an example in FIG. 4. Details for identifying multiword expressions in an input string are described in section E below while referring to examples in FIGS. 5-8.

D. Building A Multiword Expression Network

Initially at 306 in FIG. 3, a multiword expression network is built (at 302) by first encoding a set of multiword expressions of a language into multiword regular expressions. Each multiword regular expression may encode a number of derivative forms (i.e., inflections and variations) of its corresponding multiword expression. In one embodiment, the set of multiword expressions may include expressions of a natural language or dialect of the natural language. Alternatively, the set of multiword expressions may include multiword expressions of music or chemical and/or biological compositions.

In one embodiment, the regular expressions are encoded using the idiomatic regular expression language (IDAREX) into multiword regular expressions. Formalisms of IDAREX are described in the following publications and their cited references, which are all incorporated herein by reference: Breidt et al., "IDAREX: formal description of German and French Multi-Word Expressions with Finite-State Technology", MLTT-022, November 1995; and Breidt et al., "Formal description of Multi-word Lexemes with the Finite State formalism: IDAREX", in Proceedings of COLING, Copenhagen, Denmark, 1996.

One feature of IDAREX specifies formalisms for defining the exact spelling of words (i.e., invariants): for example in the encoding ":the :young :moon" each word composing the expression must have this exact spelling to match with an input string; the text "the young moons" does not match this idiom encoding because the word "moon" must be in the singular form only. Another feature of IDAREX specifies formalisms for defining specific categories for words such as adjectives, adverbs, negatives, pronouns: for example in the DET category, which represents any determiner, the idiom ":under DET :rule" matches the text "under the rule" as well as the text "under this rule".

Other features of IDAREX specify formalisms for defining: optional words: for example "(ADJ)" defines an optional word belonging to the adjective category; the repetition of words: for example "ADJ*" defines the optional repetition of (zero or more) adjectives and "ADV+" defines the optional repetition of (one or more) adverbs; and specific word categories such as adjective, determiner, noun, verb: for example the encoding of the expression "to look swell" is "look V: :swell" which specifies that the word "look" must be considered part of the idiomatic expression only when used as a verb (in any conjugated form), not as a noun.

Each multiword expression, and its derivative forms, in the set of multiword expressions encoded as (multiword) regular expressions using IDAREX (at 306) are subsequently compiled using the (regular) expression compiler 140 into a separate multiword finite-state transducer (at 308) that is defined herein as a multiword FST or multiword expression pattern. Each path in the multiword FST defines a derivative form of the multiword expression. In one embodiment, the regular expression compiler 140 is a Xerox Finite State Compiler that is adapted to compile regular expressions encoded using IDAREX into a finite-state transducer.

In addition at 308 during compilation of the multiword regular expressions, the regular expression compiler 140 factorizes subnets that repeat in each multiword FST. Generally, the process of factorization involves decomposing repeating subnets of the multiword FST into separate subnet FSTs. In one embodiment, the subnets of the multiword FST are compiled from IDAREX grammatical category encodings. For example, the grammatical encodings for adjective (e.g., "ADJ") or verb (e.g., "V") that tend to appear frequently in multiword idiomatic expressions are replaced in a multiword FST by a subnet (or sub finite-state network).

More specifically, during factorization an arc with a label is inserted at each place a subnet appears in each multiword FST and a corresponding subnet is created that represents the factored subnet. That is, factorization suppresses repeating subnets in a finite-state network using subnets that are referenced virtually-through their labels in multiword FSTs.

At 310, a union operation is performed on all of the factorized multiword FSTs compiled at 308 to produce a multiword transducer of multiword expressions (referred herein as multiword transducer). The expression compiler 140 stores the multiword transducer at 214 as shown in FIG. 2. In one embodiment, a multiword transducer representing French idioms included approximately 148,000 paths which if not factored would have consisted of approximately 150 million paths. That is, while 150 million paths are virtually part of the multiword transducer, only 148,000 paths are "physically" part of it. This reduction in "physical" paths through the multiword transducer is taken into account when optimized path-to-number mapping is performed as explained in more detail below in section H.

While a subnet may itself be factorized, it is not made directly recursive (i.e., it cannot contain references to itself) or indirectly recursive (e.g., where subnet A contains a reference to subnet B, and subnet B contains a reference to subnet A). Consequently, the multiword transducer is not a real recursive transitional network (RTN) (i.e., a transition network that allows arc labels to refer to both symbols as well as other networks). Only finite-state grammars are used to define the multiword transducer since the use of context-free grammars may introduce the possibility of infinite recursion in a multiword expression that would possibly lead to undefined derivative forms of the multiword expression.

Finally at 312, the mapping table 212 is built that maps network paths in the upper-side-of the multiword transducer to a multiword expression identifier (ID) using optimized path-to-number mapping. The multiword expression ID in the mapping table 212 that corresponds to a path in the multiword transducer 214 identifies a multiword expression object 216 that contains the multiword expression, its associated MRE in 210, and its related information. Background regarding path-to-number mapping (i.e., word-to-number mapping) and its inverse number-to-path mapping are described in U.S. Pat. No. 5,950,184 and U.S. patent application Ser. No. 10/216,915 entitled "Information Retrieval And Encoding Via Substring-Number Mapping" and its cited references, which are all incorporated herein by reference. The operation of number-to-path mapping is the inverse of path-to-number mapping.

In order to perform multiword expression identification in one pass using a single finite-state network, path-to-number mapping is optimized for processing a large number of multiword expressions and their derivative forms. The optimization, which is described in more detail in section H, does not allows paths in the subnets of the multiword transducer contribute to the path number associated with each possible path through the multiword transducer. That is, a "physical" path in the multiword transducer has the same path number as all of its possible "virtual" paths through successive subnets along it. In other words, a path in the multiword network and all of its derived paths through possible successive subnets is given the same path number, which is referred to herein generally as "optimized path-to-number" mapping.

Figure 4:
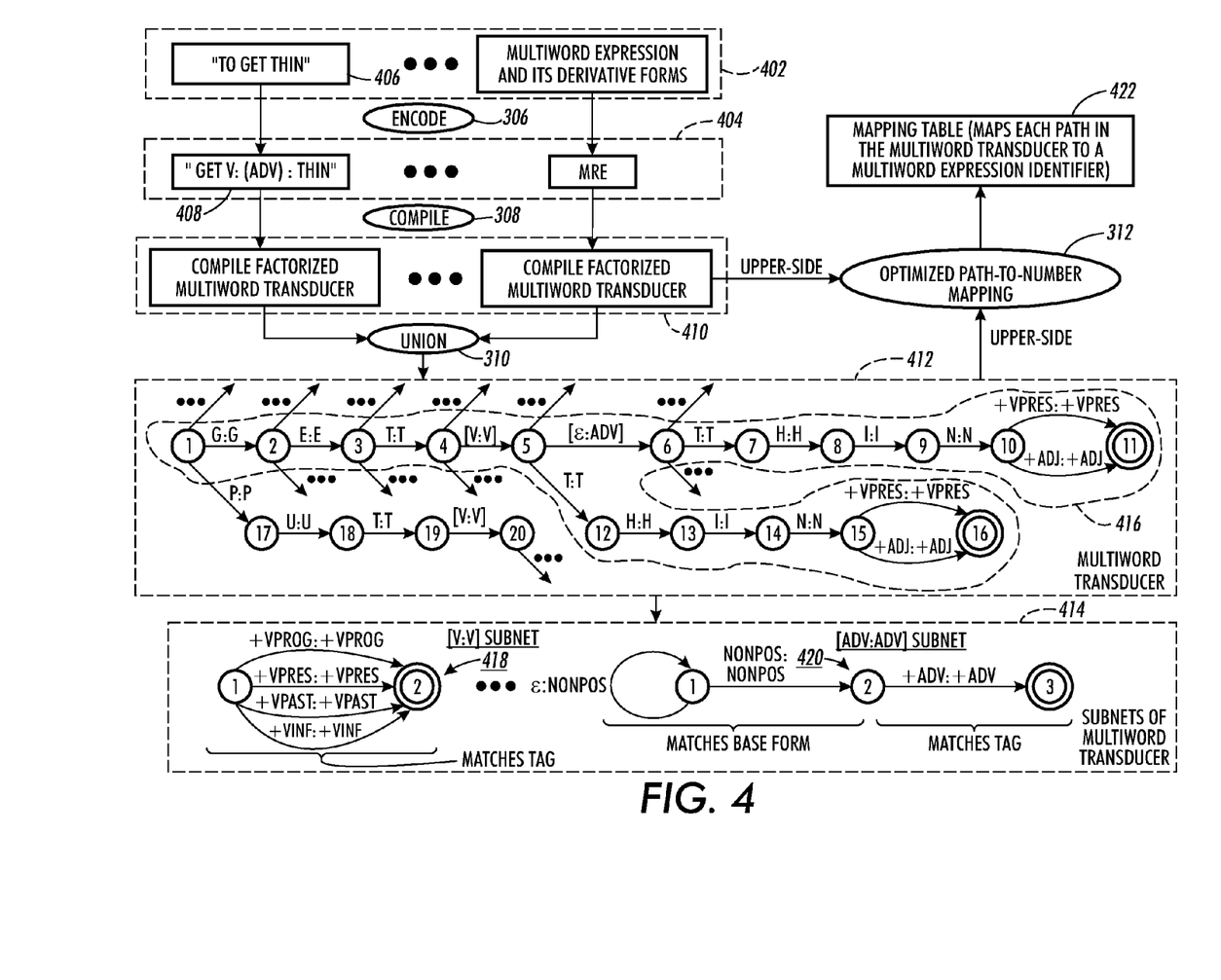
FIG. 4 illustrates an example of the acts performed at 302 in FIG. 3.

FIG. 4 illustrates an example of the acts performed at 302 in FIG. 3. Multiword expressions and their derivative forms 402 are encoded at 306 as multiword regular expressions (MRE) 404. For example, the multiword expression 406 defined as "to get thin" is expressed as a multiword regular expression 408 using IDAREX as "get V: (ADV):thin". The form of the multiword regular expression 408 allows an adverb (e.g., (ADV)) to be optionally inserted in the expression, and the word "get" must be a verb that can take on any conjugation form. For example as discussed in detail below, the multiword expression "he gets very thin" is a derivative form that matches the multiword regular expression 408 (see FIG. 5).

The multiword regular expressions 404 are compiled at 308 to compiled factorized multiword transducers 410 and subsequently are unioned together at 310 to form the multiword transducer 412 and its subnets 414. For example, the portion 416 of the multiword transducer 412 together with the subnets 418 and 420 (corresponding to the tags "[V:V]" and "[ε:ADV]" in the multiword transducer 412, respectively) represent the compiled and factorized portions of the MRE 408.

More specifically, the V subnet 418 matches any verb tag of four different conjugation forms. The ADV subnet 420 matches any base form consumed by NONPOS that is followed by the adverb part-of-speech tag "+ADV". For example, the ADV subnet 420 will accept the strings "often +ADV" or "really +ADV" but not the strings "always" or "high +ADJ".

Given the multiword transducer 412 and its subnets 414, optimized path-to-number mapping 312 is used to build the mapping table 422 that maps paths in the upper-side of the multiword transducer 412 with a multiword expression ID that can be used to identify the multiword expressions object 216 that includes MRE 404 and its related information as described in further detail below in section H.

E. Processing Input Strings

Referring again to FIG. 3, each input string received by the expression identifier 142 at 314 is processed in accordance with the acts set forth at 304. Forming part of the expression identifier 142 is a morphological analyzer and a finite-state compiler. Initially at 316, an input automaton is built using the input string by morphologically analyzing the input string using the morphological analyzer without: (a) disambiguating the input string (i.e., keeping all or most possible forms (e.g., senses) of a word as alternate paths in the network; e.g., the word "put" may be the verb "to put" or the noun "a put") and (b) without performing segmentation of the input string at the sentence level.

The morphological analysis performed at 316 in part involves replacing each word identified in the input string with its base forms plus its possible parts-of-speech. In addition at 316, once the input string is morphologically analyzed it is compiled, using the finite-state compiler, into an input automaton that is not minimized with respect to the number of states in the network. Because the automaton is not minimized, there may exist another automaton with exactly the same paths that has fewer states. By not minimizing the input automaton, the order of the arcs, which is used later to identify the derivative form of the input string, is not changed.

One advantage realized by not disambiguating the input string when the input automaton is built is that it allows the greatest number of paths in the multiword transducer 214 to be matched with the input automaton, thereby uncovering different possible senses of the multiword input string. In effect, identification of multiword expressions by the expression identifier is performed independent from any disambiguation performed on the input string (i.e., recognition performance of the expression identifier is not tied to the accuracy of a disambiguation service). A further advantage realized by not segmenting the input string at the sentence level is that matching the input automaton with the multiword transducer 214 enables recognition of cross-sentence patterns of contiguous or non-contiguous multiword expressions.

Figure 5:
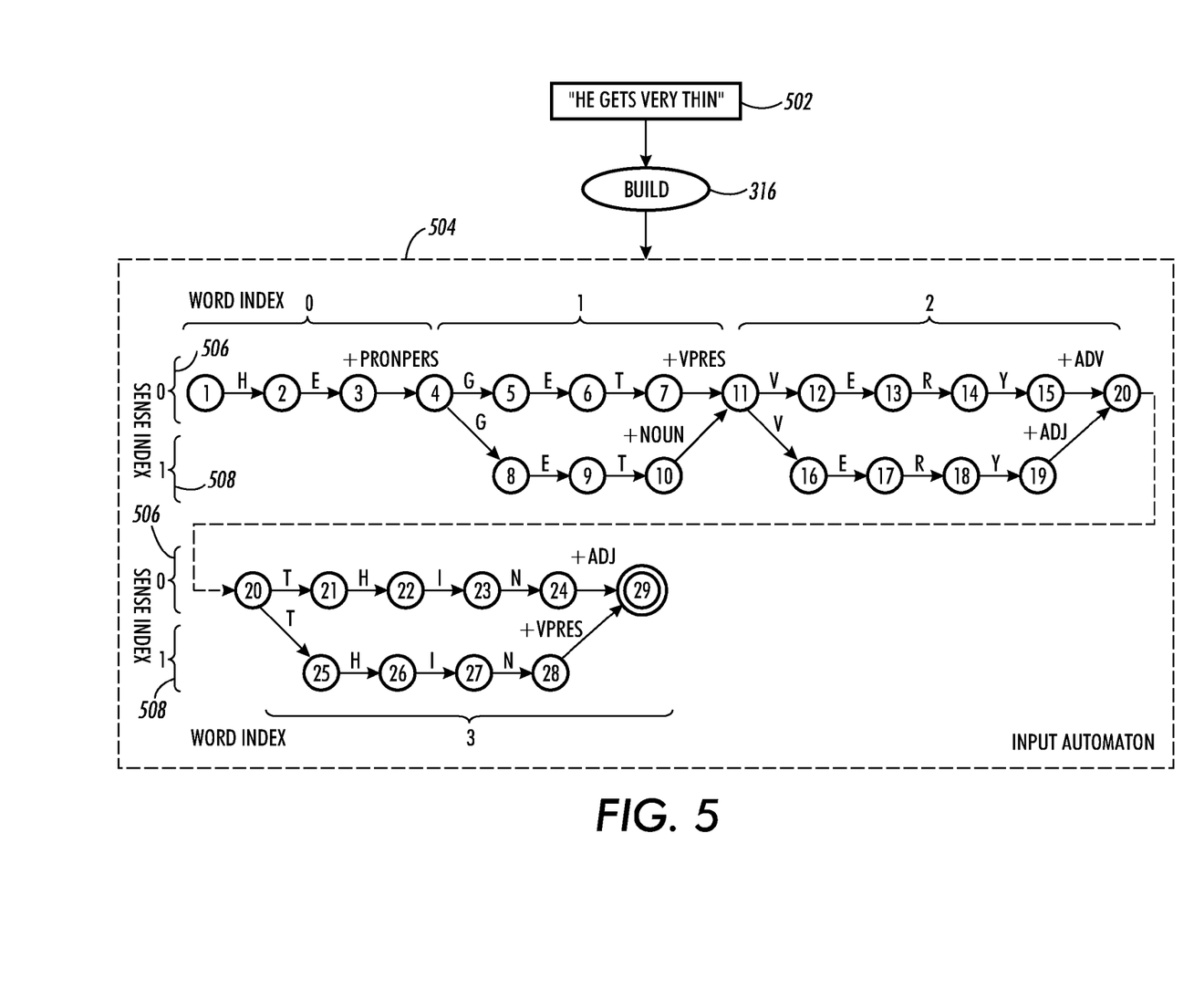
FIG. 5 illustrates an example input string built in the manner described at act 316 in FIG. 3.

FIG. 5 illustrates an example input string built in the manner described at act 316 in FIG. 3. Given the input string 502 it is morphologically analyzed and compiled into the input automaton 504. As shown in the input automaton 504, the base forms of the words "get", "very", and "thin" each have two possible grammatical forms. In this example, the part-of-speech tags in the input automaton 504 are given the following meaning: +PRONPERS means third person singular nominative pronoun; +VPRES means verb present; +NOUN means noun; +ADV means adverb; and +ADJ means adjective.

Referring again to FIG. 3, the input automaton of the input string 218 is matched to the lower-side of the multiword transducer 214 at 318. The matching performed at 318 identifies all subpaths of the input automaton built at 316 that match paths of the multiword transducer defined at 310. In addition at 318, when a match occurs between an input automaton subpath and a path of the multiword transducer, the input automaton subpath is recorded as a sequence of consecutive arc labels from the matching path of the multiword transducer that specifies a sequence of two-sided symbols.

Optimized path-to-number mapping is used at 320 to identify in the upper-side of the multiword transducer a path number for the upper-side of the sequence of symbols recorded for each input automaton subpath that matches a complete path of the lower-side of the multiword transducer.

At 322, the identified path number is looked up in the mapping table built at 312 to identify a multiword expression ID that identifies a multiword regular expression that represents a base form of a multiword expression found in the input string.

Figure 6:
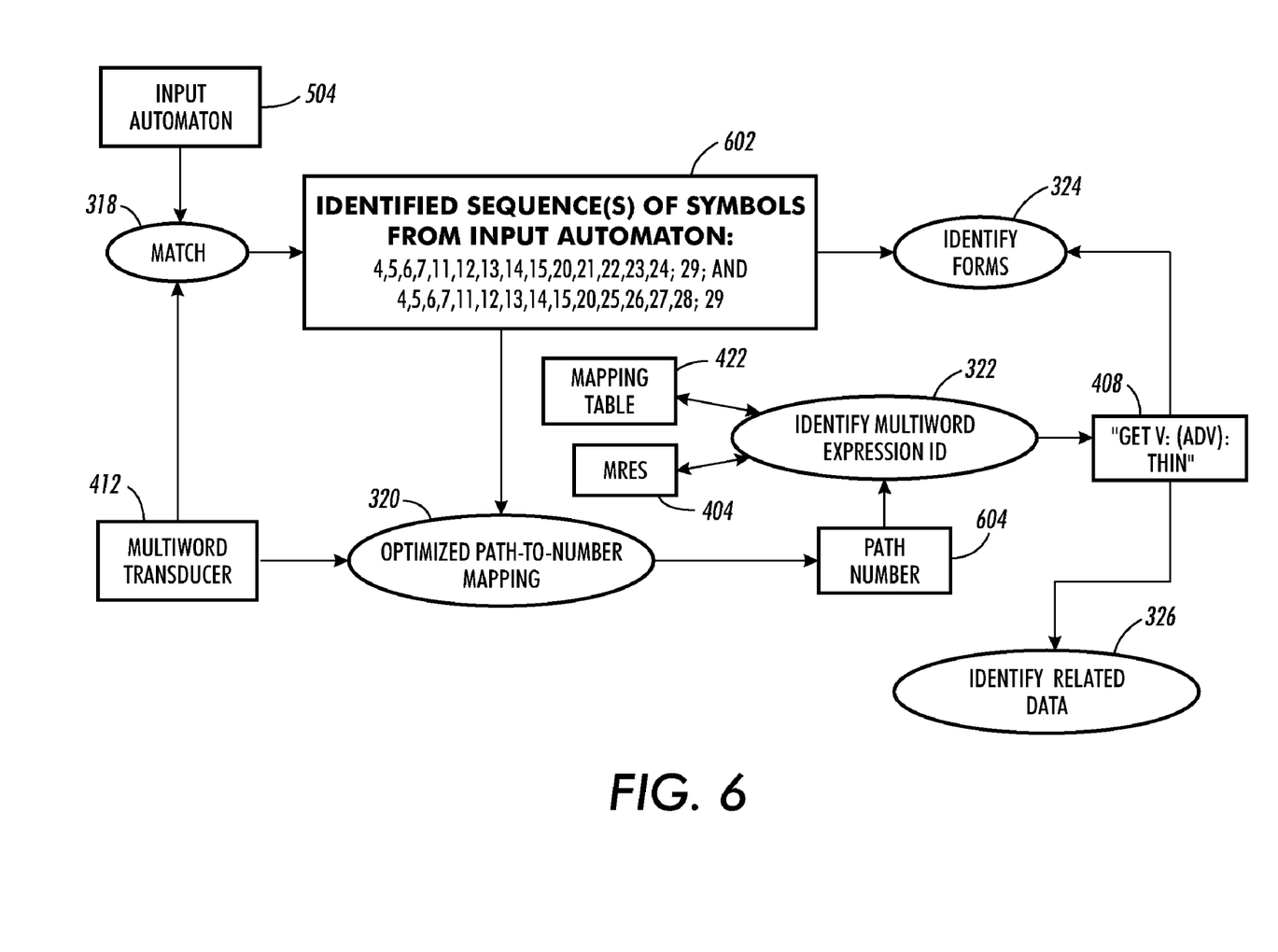
FIG. 6 illustrates an example of matching performed between the input automaton shown in FIG. 5 and the multiword transducer shown also in FIG. 4.

FIG. 6 illustrates an example of matching performed at 318 between the input automaton 504 (shown as in FIG. 5) and the lower side of the multiword transducer 412 (shown also in FIG. 4). The output of the matching operation 318 is a sequence of symbols 602 identified along the subpaths identified by the sets of states {4-7, 11-15, 20-24, 29} and {4-7, 11-15, 20, 25-29} of the input automaton 504. Both of these subpaths match the same path identified by the sets of states {1-11} in the multiword transducer 412 except for the transition from state 10 to 11 where the first subpath corresponds to the arc labeled +VPRES and the second subpath corresponds to the arc labeled +ADJ.

Also as shown in FIG. 6, optimized path-to-number mapping at 320 is used to look up a path number 604 in the multiword transducer 412 for the sequences of symbols of the upper-side of the multiword transducer 412 when its lower-side matches the sequence of symbols 602 forming a path or subpath in the input automaton 504. For example, the subpath identified by the sets of states {4-7, 11-15, 20-24, 29} in the input automaton 504 that matches the lower-side of the multiword transducer 412 (i.e., {G, E, T, +VPRES, V, E, R, Y, +ADV, T, H, I, N, +ADJ}) has the corresponding upper-side sequence of symbols defined as {G, E, T, +VPRES, ϵ, ϵ, ϵ, ϵ, ϵ, T, H, I, N, +ADJ}, and similarly the subpath {4-7, 11-15, 20, 25-29} in the input automaton 504 matching the lower-side of the multiword transducer 412 (i.e., {G, E, T, +VPRES, V, E, R, Y, +ADV, T, H, I, N, +VPRES}) has the corresponding upper-side sequence of symbols defined as {G, E, T, +VPRES, ϵ, ϵ, ϵ, ϵ, ϵ, T, H, I, N, +VPRES}. Subsequently, the path number 604 is used to identify in the mapping table 422 a multiword expression ID that identifies the multiword expression object 216, which references or contains the MRE 408 and its related data or information.

Referring again to FIG. 4, additional paths created by the subnets 414 during matching at 318 do not form part of the multiword transducer 412. However, the subnets 418 and 420 become virtually part of the multiword transducer 412 when the labels [V:V] and [ϵ:ADV] are matched with the input automaton 504. In addition because of the factorized subnets, a stack is used (in an embodiment discussed below) to match the networks using recursion. Recursion may, for example, be performed by pushing destination states of the network onto the stack, except for transitions that have a subnet label; for transitions with subnet labels, the destination state is designated as the "return state", and its address is attached as information to the start-state of a subnet (and its subsequent states in the subnet) that is pushed onto the stack. In this way, transitions are made between the multiword transducer and its subnets, and states of the subnet are process while pushing and popping subsequent subnet states on and off the stack, until returning to the multiword transducer using the return-state address attached to the subnet states.

Referring again to FIGS. 2-3, the expression identifier 142 returns to the language processing application at 220 each multiword regular expression identified at 322 with inflections as they appear in the input string at 324 and/or information related to the multiword expression such as a translation at 326, in a multiword expression object 216. In addition at 326, related information concerning the identified multiword expression provided in the multiword expression object 216 may include morphologic, syntactic, or semantic information such as word categorization information, frequency of use (e.g., common expression), style of use (e.g., familiar or formal), pronunciation, and nuances of use. Also at 326, information such as related (e.g., synonyms or antonyms) or overlapping multiword expressions can be provided concerning the identified multiword expression. For example, if the encoded multiword expressions describe patterns such as dates, times, personal and company names, locations, currency amounts, etc., then these multiword expressions can be used to identify related information, such as category information that the matching input automaton belongs to.

Figure 7:
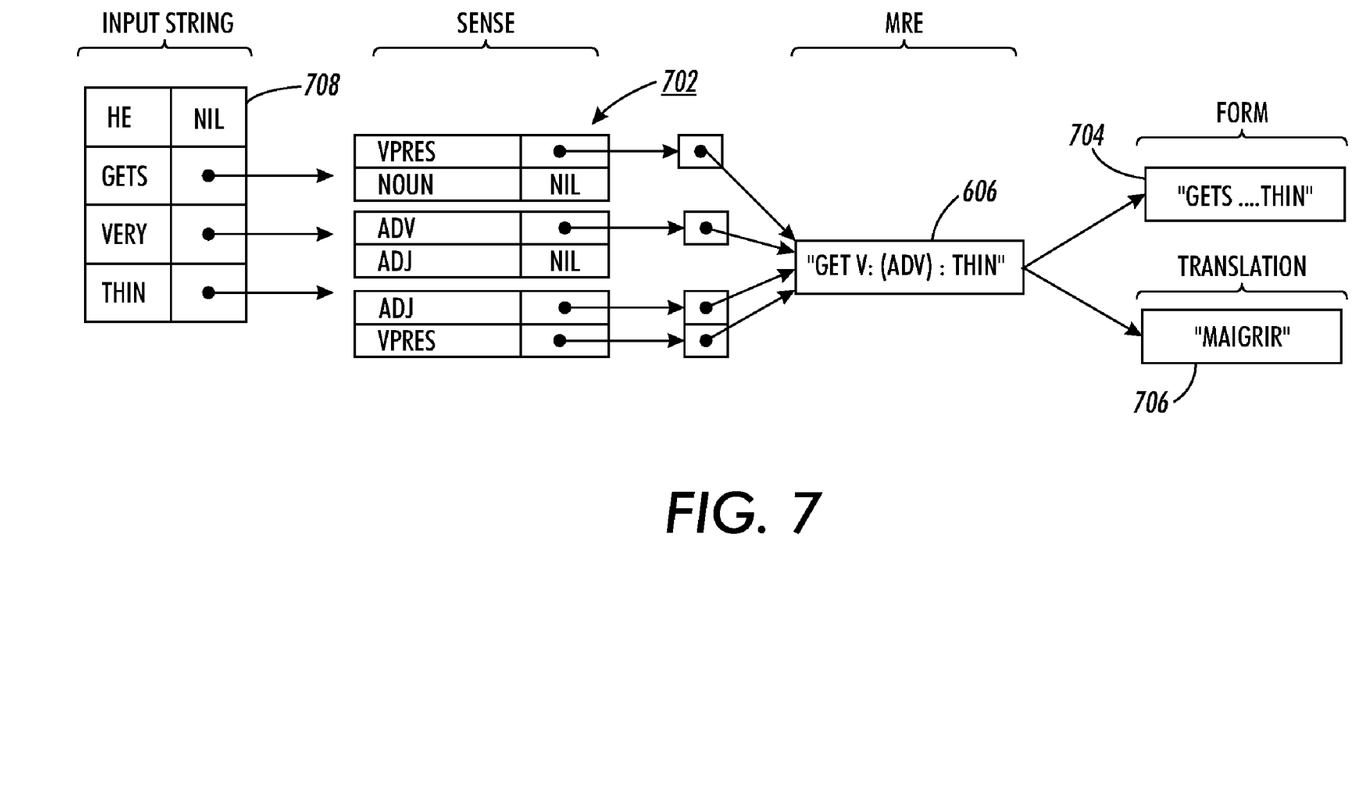
FIG. 7 illustrates one embodiment in which results of an analyzed substring may be made available to a user for the example shown in FIGS. 4-6.

FIG. 7 illustrates one embodiment in which results of an analyzed substring may be presented to a user for the example shown in FIGS. 4-6, which includes all possible senses 702, the identified MRE 606, the inflected form 704, and the translations 706. In order to retrieve each inflected form of the words in the MRE 606 from the input string, a sequence of words 708 is defined at the time the sequence of consecutive labels is recorded at 318. In the sequence 708, the words "he", "gets", "very", "thin" are associated with the numbers 0, 1, 2, 3, respectively. Thus in defining the inflected forms 704 of the MRE 606 only the string "gets . . . thin" appears because the words "he" and "very" are not (a required) part of the MRE 606. In an alternate embodiment, words that are not required in the MRE 606 are also included with the inflected form 704. In yet another embodiment, the longest, shortest, and/or intermediate matching subpaths of matching MREs are identified at 324.

Figure 8:
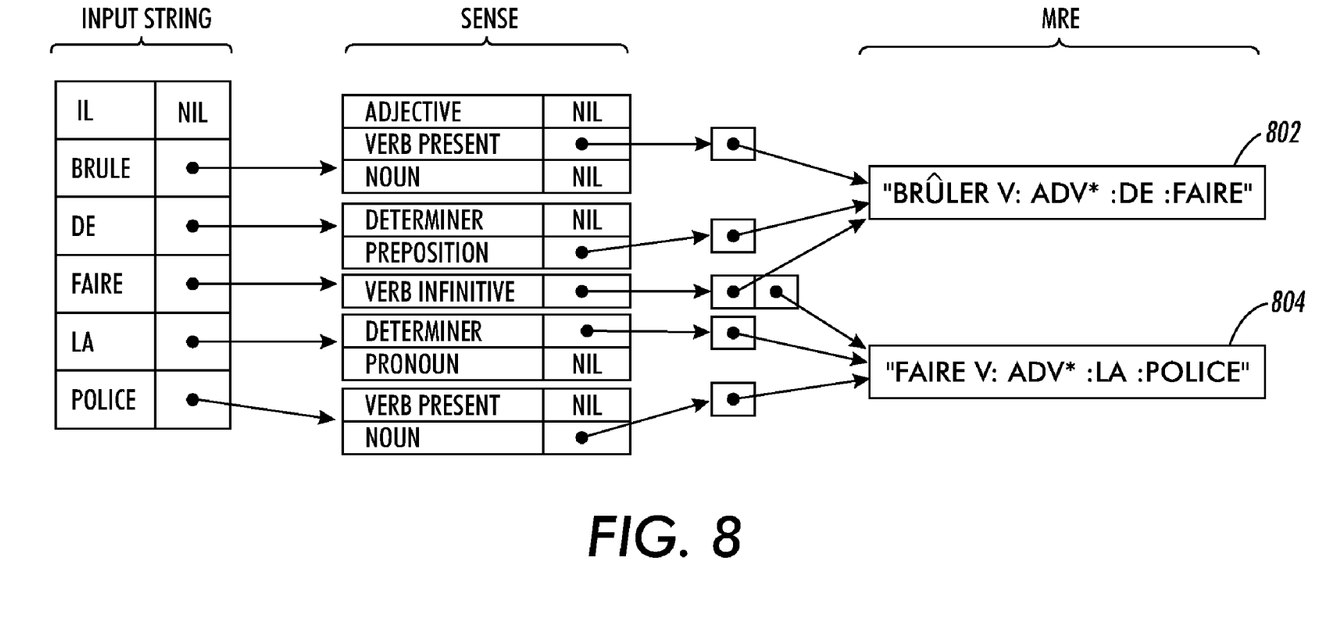
FIG. 8 illustrates an example of results that may be made available to a user when a word in an input string matches more than one multiword expression.

Generally, FIG. 8 illustrates an example of an input string that contains overlapping multiword expressions (i.e., two multiword expressions in a sentence that share at least one word). More specifically, FIG. 8 illustrates another embodiment of results of an analyzed substring that may be made available to a user, in which two multiword regular expressions 802 and 804 are identified in the input string "il br û le de faire la police" (in French). In this example, the word "faire" belongs to two idiomatic expressions that overlap in one input string. As shown in FIG. 8, each word in the input string is shown with each multiword expression that it belongs to. Similarly, the following two idiomatic expressions with the common word "to do" in the input string "he promised to do the washing up" would have been identified for the user: "to promise to do something" and "to do the washing up".

F. Embodiments For Matching

In one embodiment, the matching of the input automaton to the multiword transducer (at act 318 in FIG. 3) is performed while traversing the input automaton and (the lower-side of) the multiword transducer by synchronously transitioning between successive arcs with labels that match until a final state in the multiword transducer is reached. Searching for matches does not stop once a first match is found; instead, searching for matches continues until all possible matching transitions are explored. In addition while searching for matches between the networks in this embodiment, all possible alternative matching transitions are stored before traversing a matching arc. Subsequently, when a matching final state is reached in the multiword transducer, the matching path is recorded while backtracking to explore unexamined alternative paths.

In this embodiment a stack is used to carry out the synchronous transitions between successive arcs in the networks. In addition, the stack is useful for recursively examining subnets detected in the multiword transducer. In operation, the start state of the input automaton and the start state of the multiword transducer are set to be the current state pair. Beginning with the current state pair, all transitions of the input automaton are examined. For each transition of the input automaton, all the matching transitions from the current start state in the multiword transducer are examined.

When a matching transition is found, the pair of states made up of the destination state in the input automaton and the destination state in the multiword transducer is pushed onto the stack, together with an array containing the sequence of matching input automaton labels that have been recorded up to that point in the search for a match. Once all of the possible transitions of the input automaton have been processed, a pair of states is popped from the stack to become the current state pair to be processed.

When a transition is encountered in the multiword transducer with an arc having a subnet label, the subnet arc label is considered a possible matching transition and a new pair of states is systematically pushed onto the stack that is made up of the current input automaton state and the start state of the subnet. When pushing the new pair of states onto the stack, the current multiword transducer destination state is attached as additional information. This additional information provides the location (or return state) where the search for matching transitions should continue once all the transitions of the subnet are successfully tested (i.e., if subnet matches fail the return state is abandoned).

State pairs defined using either states from the multiword transducer or the subnets of the multiword transducer are treated similarly. This allows transitions between subnets and the multiword transducer to be performed automatically and transparently when the current state pair is popped off the stack. The only distinction between subnet current state pairs and multiword transducer current state pairs is that the subnet current state pairs record a return state.

When a new pair of states is processed, the first test performed is to determine whether the current network-state is a final state. If it is a final state, then the current network-state is tested to determine whether the current network-state is a subnet state. When the current network-state is a final state and a subnet state, then the return state becomes the current network-state and the first test is performed again to determine whether the current network-state is a final state. If the current network-state is a final state then a match is found. As long as the stack is not empty, alternative paths are explored for matches.

Once a match is found the match is appended to a list of all previously recognized matches in the multiword transducer. In addition, when recording a successful match a sequence for the input automaton is recorded that includes for each transition: a matching label, a word index, and a sense index for each word morphologically analyzed. The recorded sequence of information for each match permits the final output to be analyzed in the manner illustrated in FIG. 7.

The sense index of a word in the matching sequence is based on the order in which the different analyses of the word are produced during morphological analysis at act 316 in FIG. 3. In one embodiment, the sense index is recorded only with transitions corresponding to the start of a new word (e.g., transitions from states 1, 4, 11, and 20 in FIG. 5). In an alternate embodiment, the sense index is recorded with each transition. In this alternate embodiment, the transitions identified at 506 would be recorded with a sense index equal to zero and the transitions identified at 508 would be recorded with a sense index equal to one.

More specifically in order to maintain the correct sense indices for words in the input string after being morphologically analyzed, the input automaton retains the order of the morphological variants for each word as shown in FIG. 5. That is, from each state that corresponds to the beginning of a word in the input automaton, the first transition leads to a first morphological analysis (e.g., the transition from state 4 to state 5 in FIG. 5, which is assigned sense zero) and the second transition (if any) leads to a second morphological analysis (e.g., the transition from state 4 to state 8 in FIG. 5, which is assigned sense one), etc. Thus, in order to preserve the original ordering of arcs in the input automaton, the input automaton is not minimized with respect to the number of states in the network at 316 in FIG. 3. That is, the input automaton maintains the order of its states and transitions consistent with the order of words in the input string and the order their senses are assigned during morphological analysis.

When matching begins, each multiword expression may be found anywhere in the input automaton. Consequently the first multiword expression may not begin until several states after the start state of the input automaton. If the first current state pair must include the start state of the input automaton and the first multiword expression does not begin at the start state then no match will be found. In one embodiment, this start condition is handled using an "any-loop" at the start state of the multiword transducer. The any-loop matches any kind of symbol in input automaton, thereby permitting testing for matching to move forward in the input automaton until a match is found. One disadvantage of the any-loop, however, is it may result in the identification of "inner-word matches" (i.e., matches not starting at the beginning of a word) of the input automaton, leading potentially to meaningless results.

In another embodiment that prevents inner-word matches of the first word in a multiword expression, this start condition is handled by testing whether the current state of the multiword transducer is a start state after testing for possible matches (and none are found), and if the current state of the multiword transducer is a start state then the state pair consisting of the destination state of the current state of the input automaton and the start state of the multiword transducer are pushed onto the stack. In addition, when processing the input automaton transition, if the current state of the multiword transducer is a start state, and the current input automaton state does not correspond to the beginning of a word, then no attempt is made to identify possible matches between transitions states of the current state pair before advancing to the next transition state, thereby preventing inner-word matches of the first word in a multiword expression.

G. Cross-Sentence Multiword Expressions

Generally, cross-sentence multiword expressions exist across sentence boundaries. In order to process an input string that consists of more than a single sentence, morphological analysis performed at 316 in FIG. 3 does not segment the input string at the sentence level. However, even though the input string is not segmented into sentences, the morphological analysis performed at 316 in FIG. 3 does identify sentences boundaries in the input string to carry out cross-sentence multiword expression identification.

In one embodiment not adapted to identify cross-sentence multiword expressions, inserted punctuation tags for identified sentences allow the expression identifier to detect the end of each sentence and then to process the text sentence by sentence. That is, for each new sentence identified in the input string a new input automaton is build at 316, while matching at 318 is performed against the multiword transducer.

In an alternate embodiment adapted to identify cross-sentence multiword expressions, the input automaton is encoded with a whole paragraph or paragraphs as a single text unit. In this alternate embodiment, successive sentences are matched at 318 as a single text unit encoded in one input automaton. In addition in this alternate embodiment, the multiword expressions in the multiword transducer are matched with a single input automaton that can be used to search for cross-sentence connections encoded as syntactic patterns with long-dependencies. For example, a multiword regular expression (MRE) can be defined that spans two successive sentences for matching a personal name and a related pronoun.

An example MRE could be: "PersonalName ANY* SentenceBoundary ANY* PersonalPronoun", where "PersonalName" is a pattern intended to match surface elements representing a personal name such as for instance "Dr." or "Pr." followed by any surface form. "ANY" is a pattern matching any surface form (where the '*' symbol indicates an optional repetition). "SentenceBoundary" is a pattern matching the lexical form of any punctuation mark (e.g., ".+SENT" or ":+PUNCT"); and "PersonalPronoun" is a pattern matching any personal pronoun. For instance, this example MRE can be used for matching the cross-sentence connection between "Dr. Lee" and "He" in the following two sentences: "Dr. Lee was recently promoted as President of the Middle East Division. He is now working at Sanushi Company in charge of research and telecommunication." More generally once matches have been identified, the system outputs a list of all the matches found in the input string, without selecting the most relevant or significant to the user. Accordingly, this multiword expression identification system can be used as a first step in entity and fact extraction. To reduce noise during matching (i.e., limit the identification of meaningless over-generation of identified multiword expressions) long-dependency patterns can be restricted to a predefined number of successive sentences (e.g., two).

H. Optimized Path-To-Number Mapping

In one embodiment, the processing of related information is performed using optimized path-to-number mapping. Generally, path-to-number mapping uses a finite-state network to represent "n" strings from a given set and to relate each of these strings to a unique integer in the dense range zero to (n−1), and vice versa for number-to-path mapping. Path-to-number mapping requires that each state in the finite-state network be preliminarily marked (referred to below as preliminary marking) with an integer representing the number of paths that can be completed from that state (i.e., that lead to a final state). This requires the finite-state network to be non-circular (i.e., the finite-state network does not contain-any direct or indirect looping paths).

To retrieve related information, such as a translation of a multiword expression a mapping table is build at 312 in FIG. 3. Each multiword expression compiled as the multiword transducer is listed in the mapping table as a (source, target) pair, where the source is the path number of the multiword expression in the multiword network and the target is the multiword expression ID that can be used to identify the MRE and related information of the multiword expression.

More specifically, once the multiword transducer is created, each path "j" corresponding to a multiword expression "i" or one of its derivative forms is processed by: (a) performing optimized path-to-number mapping to relate path "j" in the multiword transducer with a unique integer "n"; and (b) storing at index "n" in a mapping table the value "i" (where "i" is the current index of the multiword expression) that may be used to retrieve the multiword regular expression object 216.

When processing an input string at 304 in FIG. 3, each time a match between the input automaton and the multiword transducer has been found, optimized path-to-number mapping is used again at 320 to map the result of the match to its path number in the multiword transducer. With the path number, the multiword expression ID is located in the mapping table. The multiword expression ID is then used to locate a multiword expression object 216 that contains information such as the multiword expression, its MRE, and its related information such as its translation.

Optimized path-to-number mapping performed when building the mapping table at 312 in one embodiment traverses only the multiword transducer by traversing arcs with subnet labels without jumping to their corresponding subnets. For example, in the multiword transducer 412 shown in FIG. 4, path-to-number mapping transitions from state 4 to state 5 without jumping to state 1 in subnet 418. In an alternate embodiment, the optimized path-to-number mapping is performed at 312 by traversing subnets without accounting for them when ascertaining a path number in a similar manner as described for the optimized path-to-number mapping performed at 320.

The optimized path-to-number mapping performed when processing an input string at 320 traverses both the multiword transducer and its subnets but determines the path number accounting for only the states and transitions in the multiword network. That is, the optimized path-to-number mapping performed herein does not take into account the additional paths of subnets introduced during factorization when the path number is determined. It should be noted that during preliminary marking only the physical paths of the multiword transducer are taken into account.

Thus, for example performing optimized path-to-number mapping performed at 320 for the sequence of symbols {G, E, T, +VPRES, $\epsilon$, $\epsilon$, $\epsilon$, $\epsilon$, $\epsilon$, T, H, I, N, +ADJ} and {G, E, T, +VPAST, $\epsilon$, $\epsilon$, $\epsilon$, $\epsilon$, $\epsilon$, T, H, I, N, +ADJ} on the multiword transducer 412 and its subnets 414 would yield the same path number because the optimized path-to-number mapping does not count state transitions occurring in the [V:V] subnet 418. Note that while optimized path-to-number mapping at 320 did not count state transitions in the subnet 418, it did traverse its paths (i.e., +VPRES and +VPAST for the two sequence of symbols in this example).

By eliminating the contribution of subnet paths to the computation of a path number associated with a path through the multiword transducer, the total number of paths in the multiword transducer is minimized, thereby enabling the generation of a single network that can be used for matching with an input automaton and locating information in one pass associated with identified multiword expressions in the input automaton, as illustrated in FIGS. 7 and 8.

Optimized path-to-number mapping operates on finite-state networks transformed into non-circular (i.e., loop-free) finite-state networks. This transformation accounts for multiword expressions encoded for instance with the IDAREX feature "ADJ" that by definition introduce looping subpaths into the multiword transducer. To transform the multiword transducer with looping arcs into a non-circular network, each looping arc in the multiword transducer was compiled (e.g., networks 410 compiled at 308 in FIG. 4) with a two-sided symbol that contains an epsilon symbol on its upper side (e.g., [$\epsilon$:ADJ] instead of [ADJ:ADJ]). Inserting the epsilon symbol (i.e., $\epsilon$), which stands for the empty string, has the effect of eliminating looping arcs when the upper-side automaton is extracted from the multiword transducer.

Before performing optimized path-to-number mapping, the upper-side network (i.e., the side with the epsilon symbol) is extracted from the multiword transducer to define an automaton. The resulting automaton is non-circular though similar to the original transducer, and optimized path-to-number mapping continues using the non-circular automaton. Referring again to FIG. 4, to be insured that the multiword transducer 412 or its subnets 414 do not contain looping arcs, the multiword transducer 412 and its subnets 414 are converted into non-circular networks as set forth above and the resulting multiword automaton (i.e., upper-side of the non-circular multiword transducer) and its subnets (i.e., upper-side of the non-circular subnets) are used to perform optimized path-to-number mapping at 312 (or at 320 shown in FIG. 6).

Figure 9:
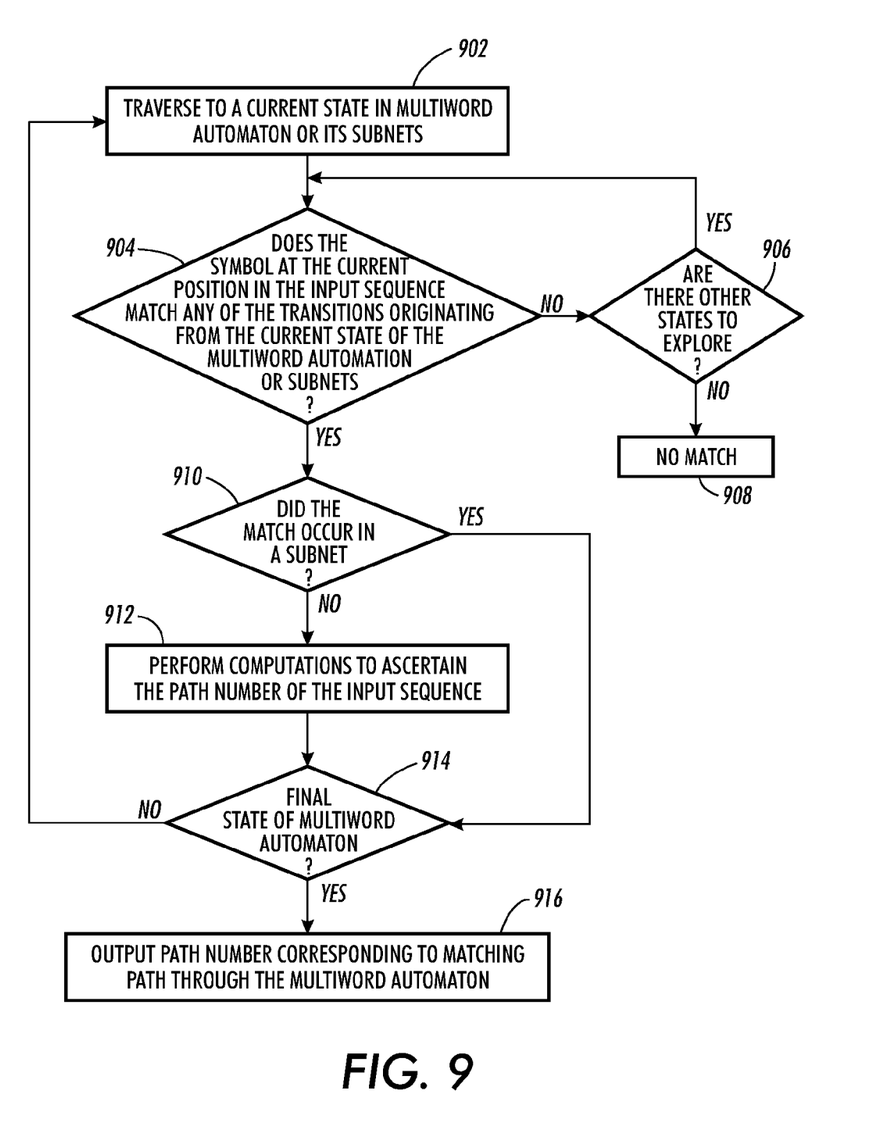
FIG. 9 is a flow diagram for performing optimized path-to-number mapping.

FIG. 9 is a flow diagram for performing optimized path-to-number mapping on the multiword automaton and its subnets using a sequence of symbols (i.e., input sequence). At 902, a current state of the multiword automaton or its subnets is traversed while matching symbols at the transitions with the current symbol in the input sequence. At 904, if no symbols at the current position in the input sequence matches any of the transitions originating from the current state being evaluated in the multiword automaton or its subnets then the act at 906 is performed; otherwise, the act at 910 is performed (when the current symbol in the input sequence matches the symbol associated with the current state, the current symbol becomes the next symbol in the input sequence, unless at 906 backtracking is necessary). At 906, if no other candidate states exist in the multiword automaton or its subnets that remain to be explored, then no match is identified at 908 and path-to-number mapping terminates without having identified a path number corresponding to the input sequence; otherwise, processing continues at 904.

If a match did occur at 904 and it occurred in a subnet as determined at 910, then no computation is performed at 912 to ascertain the path number for the input sequence; only matches that occur at 904 in the multiword automaton are used to ascertain the path number for the input sequence at 912. If at 914, the state of the current position in the multiword automaton is a final state of the multiword automaton then the output path number corresponding to the matching path through the multiword automaton is output for further processing at 916; otherwise, act 902 is repeasted. As set forth above in one embodiment, the path number can then be used to identify a multiword expression object 216 containing and/or identifying information related to the input sequence.

I. Miscellaneous

It will be appreciated by those skilled in the art that the technique described herein are not limited to natural language and could be used with other applications such as bioinformatics and music. For more details on computational linguistics reference is made to "The Oxford Handbook of Computational Linguistics", Edited by Ruslan Mitkov, University of Wolverhampton, October, 2002; Karttunen, "Constructing lexical transducers", in Proceedings of COLING-94, 1:406-411, Kyoto, Japan, 1994; which are all incorporated herein by reference. Further details of regular expressions compilers are disclosed by Karttunen et al. "Two-level Rule Compiler", Technical Report ISTL-92-2 Xerox PARC, June, 1992, Palo Alto, Calif. Also further background concerning factorization of networks is disclosed by Woods in "Transition Network Grammars of Natural Language Analysis", published in Communications of the ACM, 13, 591-606, 1970.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

It will be appreciated that various other alternatives, modifications, variations, improvements or other such equivalents of the teachings herein that may be presently unforeseen, unappreciated or subsequently made by others are also intended to be encompassed by the claims.

The invention claimed is:

1. A method for mapping multiword expressions to identifiers using finite-state networks, comprising:
   encoding each of a plurality of multiword expressions into a regular expression; each regular expression encoding a base form common to a plurality of derivative forms defined by ones of the multiword expressions;
   compiling with factorization each of the plurality of regular expressions into a set of finite-state networks;
   performing a union of the finite-state networks in the set of finite-state networks to define a multiword finite-state network and a set of subnets, each subset comprising a distinct standard network having an associated distinct start state and an associated final state comprising an entry and exit point, respectively, comprising arcs and states distinct from arcs and states of the finite-state network;
   traversing the multiword finite-state network and the set of subnets to identify a path corresponding to one of the plurality of multiword expressions;
   wherein said traversing accounts for only transitions originating from the multiword finite-state network to ascertain a path number identifying a base form of the one of the plurality of multiword expressions; and
   wherein said factorization comprises inserting an arc with a label in the multiword finite-state network at each appearance of a repeating subnet in the set of subnets, where each label is a reference to a subnet in the set of subnets.

2. The method according to claim 1, further comprising identifying information related to the one of the plurality of multiword expressions using the path number.

3. The method according to claim 2, wherein the information related to the one of the plurality of multiword expressions includes one of categorization information, frequency of use, style of use, pronunciation, nuances of use, a synonym, an antonym, and a translation.

4. The method according to claim 1, further comprising defining each of the plurality of multiword expressions using a sequence of symbols.

5. The method according to claim 4, wherein symbols in the sequence of symbols are one of alphanumeric characters, music notes, chemical formulations, biological formulations, and kanji characters.

6. The method according to claim 1, wherein the path corresponding to the one of the plurality of multiword expressions traversed through the multiword finite-state network and the set of subnets is unique.

7. The method according to claim 6, wherein the path number uniquely identifies the base form of the one of the plurality of multiword expressions.

8. The method according to claim 7, further comprising defining the path number of a base form common to a plurality of derivative forms defined by ones of the multiword expressions by transitioning through the multiword finite-state network without transition to any one the subnets in the set of subnets.

9. The method according to claim 1, wherein the multiword finite-state network is non-circular.

10. An apparatus for mapping multiword expressions to identifiers using finite-state networks, comprising:
  means for encoding each of a plurality of multiword expressions into a regular expression; each regular expression encoding a base form common to a plurality of derivative forms defined by ones of the multiword expressions;
  means for compiling with factorization each of the plurality of regular expressions into a set of finite-state networks;
  means for performing a union of the finite-state networks in the set of finite-state networks to define a multiword finite-state network and a set of subnets, each subset comprising a distinct standard network having an associated distinct start state and an associated final state comprising an entry and exit point, respectively, comprising arcs and states distinct from arcs and states of the finite-state network;
  means for traversing the multiword finite-state network and the set of subnets to identify a path corresponding to one of the plurality of multiword expressions;
  wherein said traversing means accounts for only transitions originating from the multiword finite-state network to ascertain a path number identifying a base form of the one of the plurality of multiword expressions; and
  wherein said factorization comprises inserting an arc with a label in the multiword finite-state network at each appearance of a repeating subnet in the set of subnet, where each label is a reference to a subnet in the set of subnets.

11. The apparatus according to claim 10, further comprising means for identifying information related to the one of the plurality of multiword expressions using the path number.

12. The apparatus according to claim 11, wherein the information related to the one of the plurality of multiword expressions includes one of categorization information, frequency of use, style of use, pronunciation, nuances of use, a synonym, an antonym, and a translation.

13. The apparatus according to claim 10, further comprising means for defining each of the plurality of multiword expressions using a sequence of symbols.

14. The apparatus according to claim 13, wherein symbols in the sequence of symbols are one of alphanumeric characters, music notes, chemical formulations, biological formulations, and kanji characters.

15. The apparatus according to claim 10, wherein the path corresponding to the one of the plurality of multiword expressions traversed through the multiword finite-state network and the set of subnets is unique.

16. The apparatus according to claim 15, wherein the path number uniquely identifies the base form of the one of the plurality of multiword expressions.

17. The apparatus according to claim 16, further comprising means for defining the path number of a base form common to a plurality of derivative forms defined by ones of the multiword expressions by transitioning through the multiword finite-state network without transition to any one the subnets in the set of subnets.

18. The apparatus according to claim 10, wherein the multiword finite-state network is non-circular.

19. An article of manufacture for use in a machine, comprising:
  a) a memory;
  b) instructions stored in the memory for mapping multiword expressions to identifiers using finite-state networks, the instructions adapted to perform a method comprising:
  encoding each of a plurality of multiword expressions into a regular expression; each regular expression encoding a base form common to a plurality of derivative forms defined by ones of the multiword expressions;
  compiling with factorization each of the plurality of regular expressions into a set of finite-state networks;
  performing a union of the finite-state networks in the set of finite-state networks to define a multiword finite-state network and a set of subnets, each subset comprising a distinct standard network having an associated distinct start state and an associated final state comprising an entry and exit point, respectively, comprising arcs and states distinct from arcs and states of the finite-state network;
  traversing the multiword finite-state network and the set of subnets to identify a path corresponding to one of the plurality of multiword expressions;
  wherein said traversing accounts for only transitions originating from the multiword finite-state network to ascertain a path number identifying a base form of the one of the plurality of multiword expressions; and
  wherein said factorization comprises inserting an arc with a label in the multiword finite-state network at each appearance of a repeating subnet in the set of subnets, where each label is a reference to a subnet in the set of subnets.

20. The article of manufacture according to claim 19, wherein the method further comprises identifying information related to the one of the plurality of multiword expressions using the path number.

* * * * *